United States Patent [19]

Wenski et al.

[11] Patent Number: 5,527,755
[45] Date of Patent: Jun. 18, 1996

[54] CATALYST FOR THE CATALYTIC AFTERBURNING OF EXHAUST GASES CONTAINING CARBON MONOXIDE AND/OR OXIDIZABLE ORGANIC COMPOUNDS

[75] Inventors: Guido Wenski, Portland, Oreg.; Margit Hammer, Munich, Germany

[73] Assignee: Consortium Fur Elektrochemische Industrie GmbH, Munich, Germany

[21] Appl. No.: 211,984

[22] PCT Filed: Apr. 8, 1993

[86] PCT No.: PCT/EP93/00873

§ 371 Date: Apr. 25, 1994

§ 102(e) Date: Apr. 25, 1994

[87] PCT Pub. No.: WO93/20936

PCT Pub. Date: Oct. 28, 1993

[30] Foreign Application Priority Data

Apr. 9, 1992 [DE] Germany .................. 42 12 020.9

[51] Int. Cl.⁶ .................. B01J 21/06; B01J 23/16; B01J 23/40
[52] U.S. Cl. .................. 502/325; 502/349; 502/353
[58] Field of Search .................. 502/349, 350, 502/353, 325; 423/213.5

[56] References Cited

U.S. PATENT DOCUMENTS

| | | | |
|---|---|---|---|
| 3,282,861 | 11/1966 | Innes | 252/455 |
| 3,438,721 | 4/1969 | Innes | 23/2 |
| 3,799,886 | 3/1974 | Felice et al. | 252/461 |
| 4,238,370 | 12/1980 | König | 252/461 |
| 4,537,873 | 8/1985 | Kato et al. | 502/242 |
| 4,623,637 | 11/1986 | Vander Smissen | 502/333 |
| 4,725,572 | 2/1988 | Sera et al. | 502/236 |
| 4,816,135 | 3/1989 | Martinez et al. | 208/120 |
| 5,157,007 | 10/1992 | Domesle et al. | 502/66 |

FOREIGN PATENT DOCUMENTS

| | | |
|---|---|---|
| 0174495 | 3/1986 | European Pat. Off. . |
| 0211233 | 2/1987 | European Pat. Off. . |
| 0238700 | 9/1987 | European Pat. Off. . |
| 0547226 | 4/1992 | European Pat. Off. . |
| 3940758 | 6/1991 | Germany . |
| 1140264 | 1/1969 | United Kingdom . |

OTHER PUBLICATIONS

The Merck Index, Ninth Edition (1976), #603, p. 77.
Derwent AN 70-76540R (DE 1417648) No date available.
Derwent AN 77-22200Y (DE 2641317) No date available.
C.A. 77: 33,958 Apr. 1972.
C.A. 106: 161,975 Nov. 1984.
C.A. 108: 100,457 Aug. 1987.
Vassileva M. et al, Comp. Rend. Bulg. Sci. 36, 1547–1550 (1983).
Vassileva M. et al, Appl. Catal. 49, 125–141 (1989).
Vassileva M. et al, Appl. Catal. 69, 221–234 (1991).

Primary Examiner—Shrive Beck
Assistant Examiner—Fred J. Parker
Attorney, Agent, or Firm—Burgess, Ryan and Wayne

[57] ABSTRACT

The invention relates to catalysts for the catalytic post-combustion of exhaust gases containing carbon monoxide and/or oxidizable organic compounds and processes for their production. The catalysts contain 70 to 99% wt., calculated as $TiO_2$, of a titanium oxide component, 1 to 30% wt., calculated as $V_2O_5$ of a vanadium oxide component and 0.01 to 0.9% wt., calculated as noble metal, of a noble metal component from one or more nobel metal compounds of nobel metals of the 8th sub-group. The catalysts are characterized by a low starting ($\leq 220°$ CC.) and operating temperature and their ability to oxidize even slight pollution of the exhaust gas with oxygen-containing or free aliphatic and aromatic hydrocarbons and carbon monoxide in the presence of gases containing molecular oxygen almost quantitatively to the substantially ecologically acceptable products carbon dioxide and water.

8 Claims, No Drawings

CATALYST FOR THE CATALYTIC AFTERBURNING OF EXHAUST GASES CONTAINING CARBON MONOXIDE AND/OR OXIDIZABLE ORGANIC COMPOUNDS

BACKGROUND OF THE INVENTION

The invention relates to catalysts for the catalytic afterburning of exhaust gases containing carbon monoxide and/or oxidizable organic compounds, especially for the purification of exhaust gases from the phthalic anhydride or maleic anhydride production and also relates to processes for the preparation thereof.

BACKGROUND ART

Oxidizable gaseous, vaporous or particulate pollutants in exhaust gases can be removed by combustion. Under conditions which permit a substantially complete oxidation of contaminants, chemically bound carbon and hydrogen are converted into the substances carbon dioxide ($CO_2$) and water ($H_2O$), which are safe with regard to air hygiene. Other exhaust gas constituents, such as sulfur compounds, nitrogen compounds or halogen compounds, are converted in the oxidative treatment into substances which, when they exceed permitted emission limit values, must be eliminated in a purification plant downstream of the combustion, e.g. by an exhaust gas scrubber. In practice, therefore, exhaust gas combustion is preferably employed where contaminants essentially composed of carbon and hydrogen are to be destroyed and where, in addition, utilization of recovered exhaust gas constituents is not possible or other purification processes are unsatisfactory. (Ullmanns Encyklopädie der Technischen Chemie [Ullmanns Encyclopedia of Industrial Chemistry], "Verfahren und Geräte zur Abgasreinigung [Processes and equipment for exhaust gas purification]"; 4th Edition, Verlag Chemie: Weinheim 1981, Volume 6, p. 312).

In engineering practice, a differentiation is made between thermal afterburning (TAB) at temperatures between 600° and 1100° C. and catalytic afterburning (CAB) at temperatures between 250° and 500° C. which is more favorable from the energy viewpoint. For CAB, on the one hand, noble metal catalysts are suitable, which generally comprise palladium, platinum and/or rhodium finely distributed over a heat-resistant support and are particularly sensitive to sulfur- and heavy metal-containing exhaust air streams; on the other hand, the more resistant mixed-oxide catalysts are used which contain, for example, oxides of vanadium, tungsten, copper, manganese, iron and/or cobalt. Depending on the structure, the catalysts are subdivided into unsupported catalysts (homogeneous catalysts) and supported catalysts; preferred usage forms respectively are packed bed and honeycomb catalysts.

A mixed oxide catalyst in the form of cylindrical pellets, comprising 92% by weight of $Co_3O_4$ and 8% by weight of $CeO_2$, which requires temperatures of about 290° C. for the combustion of low xylene contents in exhaust air streams, is described, for example, in DE-A 26 41 317.

Catalysts based on $TiO_2$, preferably in the anatase modification, and $V_2O_5$ can be used for a great number of partial oxidation reactions in the gas phase and, moreover,—when ammonia is added—for flue gas denitration. The gas phase oxidation of o-xylene and/or naphthalene to give phthalic anhydride (PA) with the use of vanadium- and titanium-containing supported catalysts is disclosed, for example, by DE-C 14 42 590 and DE-C 21 06 796. After desublimation of the reaction products and, if necessary, a subsequent scrubbing of the process air, the exhaust gases from PA production plants, in addition to reaction water and carbon dioxide, still contain, inter alia, carbon monoxide, o-xylene and/or naphthalene, o-tolylaldehyde, formaldehyde, phthalic anhydride and maleic anhydride, despite optimized reaction conditions. However, increasingly strict environmental regulations in some countries (e.g. the TA-Luft [Air Pollution Control Regulations] in the Federal Republic of Germany) in many cases necessitate a secondary purification of such exhaust air streams passing into the environment.

The use of a $TiO_2/V_2O_5$ catalyst for the total oxidation of organic compounds is described in DE-A 30 19 879: $TiO_2$ is impregnated with $NH_4VO_3$ solution, the product is calcined and freed from adhering $V_2O_5$ by a wash liquid. Not until an operating temperature of 350° C. is reached, is the catalyst able to completely burn vapors of o-xylene, maleic anhydride, PA, tolylaldehyde and phthalide mixed with air. The exhaust air, in addition to $CO_2$, also contains proportions of CO.

The use of palladium-oxide-doped $V_2O_5$ in combination with aluminum oxide as support material for the partial oxidation of ethylene to give acetic acid is disclosed, for example, by French Patent 1,536,185 and Japanese Patent 72/11,050 (C.A. 77: 33958). However, similarly constructed catalysts having $Al_2O_3$ in the $\alpha$ or $\gamma$ form can certainly also be used for the total oxidation of hydrocarbons and carbon monoxide in exhaust gases containing molecular oxygen. In U.S. Pat. No. 3,282,861 and U.S. Pat. No. 3,438,721, for example, catalysts specifically for the purification of motor vehicle exhaust gases are described, which comprise $Al_2O_3$, in some cases with $SiO_2$ as stabilizer, 2–10% by weight of $V_2O_5$, 2–10% by weight of CuO and 0.01–0.03% by weight of Pd and have kick-off temperatures of 240°–250° C. A similarly constructed catalyst made of an $Al_2O_3$ support impregnated with $PdCl_2$, $CuCl_2$ and $NH_4VO_3$ for the oxidation of CO to give $CO_2$ is claimed in EP-A 238700. The use of copper compounds make such catalysts unsuitable for industrial exhaust gases which can contain, for example, chloride, since copper chloride can be discharged.

JP-A-61/120,640 (C.A. 106: 161975) and JP-A-62/193,648 (C.A. 108: 100457) claim catalysts especially for the purification of diesel engine exhaust gases, which are produced by coating a monolith with $Al_2O_3$, $V_2O_5$ and a Pt compound, Pd compound or Rh-compound. Catalysts for CO oxidation in gas masks which are obtained by reduction of a calcined $Al_2O_3/V_2O_5$ PdO mixture with hydrazine are disclosed, for example, by DE-A 35 43 719.

DE-A 3940758 describes a catalyst for the purification of diesel engine exhaust gases, which catalyst is obtained by coating ceramic or metal supports, provided with ducts, with $Al_2O_3$, $TiO_2$, $SiO_2$, zeolite or mixtures thereof and with vanadium and platinum group metals.

The total oxidation of benzene as a model substance for aromatic hydrocarbons, which are difficult to oxidize, in mixtures with air on such catalyst powders is described (Vassileva, M., Georgieva, S., Andreev, A., Kotsev, N., Shopov, D., Comp. Rend. Acad. Bulg. Sci. 36, 1547–1550 [1983]; Vassileva, M., Andreev, A., Dancheva, S., Kotsev, N., Appl. Catal. 49, 125–141 [1989]; Shopov, D., Andreev, A., Kotsev, N., Georgieva, S., Vassileva, M., Bulgarian Patent 39,145 [1983; cited in the above-mentioned publication]). The catalysts are prepared by impregnating $\gamma$-$Al_2O_3$ with $NH_4VO_3$ solution, drying, calcining at 500°–520° C., impregnating with $Na_2PdCl_4$ solution, drying and activating at 300° C. in air current. The most effective of the catalysts tested contains, in addition to $Al_2O_3$, 30% by weight of $V_2O_5$ and 0.5% by weight of Pd; at 250° C. incomplete combustion, at 400° C. complete combustion, of the benzene was observed in a benzene/air mixture passed over the catalyst. Comparable catalysts which were prepared by using $AgNO_3$ instead of $Na_2PdCl_4$ likewise effect the total oxidation of benzene, but show a lower activity (Vassileva, M., Andreev, A., Dancheva, S., Appl. Catal. 69, 221–234 [1991]).

CAB catalysts for the virtually complete total oxidation of aromatic hydrocarbons in exhaust gases even in relatively low concentrations, according to the prior art, therefore possess kick-off (= ignition) temperatures or operating temperatures of at least 250° C., but generally 300° C. and above; the oxidation of CO to $CO_2$ causes no problems under these conditions.

The object was therefore to provide catalysts for the catalytic afterburning of carbon monoxide and/or of oxidizable organic compounds in process exhaust gases containing molecular oxygen, in particular exhaust gases from PA production, which catalysts are substantially resistant to catalyst poisons such as sulfur or chloride and make possible a kick-off or operating temperature of $\leq 250°$ C., preferably $\leq 230°$ C.

SUMMARY OF THE INVENTION

The subject-matter of the invention is catalysts for the catalytic afterburning of exhaust gases containing carbon monoxide and/or oxidizable organic compounds, especially of exhaust gases from the phthalic anhydride and maleic anhydride production, in the presence of molecular oxygen, containing 70 to 99% by weight, calculated as $TiO_2$, of a titanium dioxide component, 1 to 30% by weight, calculated as $V_2O_5$, of a vanadium oxide component and 0.01 to 0.9% by weight, calculated as noble metal, of a noble metal component selected from the group comprising one or more noble metal compounds of noble metals of subgroup 8, in which the percentages by weight are based on the total weight of the active components and add up to 100% by weight.

The catalysts feature a low kick-off temperature (ignition temperature) ($\leq 220°$ C.) or operating temperature and are able to oxidize even low loadings of the exhaust gas with oxygen-containing or oxygen-free aliphatic and aromatic hydrocarbons and carbon monoxide, as are present in the exhaust air streams of PA plants, in the presence of gases containing molecular oxygen, virtually quantitatively to give the ecologically considerably safer products carbon dioxide and water. Surprisingly and unexpectedly in this case was that the replacement of the aluminum oxide in catalysts according to the prior art of the composition $Al_2O_3/V_2O_5/$ oxide of a noble metal of subgroup 8 by titanium dioxide leads to catalysts having a markedly improved property profile in the CAB of process exhaust gases, in particular from the phthalic anhydride and maleic anhydride production.

DESCRIPTION OF THE PREFERRED EMBODIMENTS

The $TiO_2$ component used in the preparation of the catalysts according to the invention can be commercial pulverulent $TiO_2$ in the anatase or rutile form or mixtures of anatase and rutile. $TiO_2$ can also be prepared on site by precipitation from titanyl-containing solution and heating according to methods known from the literature (see in this context Gmelin's Handbuch der Anorganischen Chemie [Handbook of Inorganic Chemistry] "Titan [titanium]"; Verlag Chemie: Weinheim 1951, p. 79 ff.). $TiO_2$ having an anatase content of at least 50% by weight, in particular of at least 65% by weight, is preferred. For the catalysts according to the invention, anatase types having a BET surface area of at least 15 $m^2/g$ are particularly preferred, in particular having a BET surface area of 30–250 $m^2/g$. Mixtures of such high-surface area anatase types are also suitable, preferably mixtures of anatase having a BET surface area of more than 100 $m^2/g$ and anatase having a BET surface area of 5–11 $m^2/g$ or rutile having a BET surface area of 0.5–8 $m^2/g$. A titanium dioxide component particularly preferred for the invention is a mixture of 50% by weight of anatase having a mean particle diameter of 0.3 μm and a BET surface area of 7 $m^2/g$ and 50% by weight of titanium dioxide hydrate (calculated as $TiO_2$) having a mean particle diameter of below 0.01 μm and a BET surface area of 150 $m^2/g$. The mixture has a BET surface area of 78 $m^2/g$.

The vanadium component used in the catalyst preparation can in principle be various vanadium oxides or vanadium compounds which are converted into vanadium oxides on heating in air, individually or in the form of mixtures. Suitable vanadium oxides are oxides of the formula $V_nO_{2n+1}$, such as $V_2O_5$, $V_3O_7$, $V_4O_9$ and $V_6O_{13}$, oxides of the formula $V_nO_{2n}$, such as $V_2O_4$, and oxides of the formula $V_nO_{2n-1}$, such as $V_2O_3$, $V_3O_5$, $V_4O_7$, $V_5O_9$, $V_6O_{11}$ and $V_7O_{13}$; $V_2O_5$ is preferred. Such vanadium oxides can be prepared, e.g., by thermal decomposition of ammonium metavanadate, by heating mixtures of $V_2O_3$ and $V_2O_5$ or by reducing $V_2O_5$ with sulfur dioxide gas. Suitable vanadium compounds which are converted into a vanadium oxide on heating in air are ammonium metavanadate, vanadyl sulfate, vanadyl chloride, vanadyl dichloride dihydrate, vanadyl trichloride, other vanadyl halides, metavanadic acid, pyrovanadic acid, vanadium hydroxide, vanadyl acetylacetonate or vanadyl carboxylates, such as vanadyl acetate or vanadyl oxalate. Ammonium metavanadate ($NH_4VO_3$) is preferred.

Noble metals of subgroup 8 of the Periodic Table of the Elements are ruthenium, rhodium, palladium, osmium, iridium and platinum. Noble metals are preferably added in the form of compounds thereof, for example as oxide, hydroxide, acid, halide, ammonium salt, halide complex, nitrate, olefin complex, complex with nitrogen-containing ligands such as phthalocyanine or diketones such as acetylacetonate. A single noble metal can be used in the form of one or more compounds. The addition of mixtures of compounds of a plurality of noble metals is likewise possible. Palladium or a mixture of palladium with one or more other noble metals of subgroup 8 is preferably used, the noble metals being used as oxides, hydroxides, acids and/or chlorides. A palladium compound is particularly preferably used as sole noble metal component, in particular palladium oxide. The noble metal component is preferably added in an amount of 0.01–0.9% by weight, particularly preferably 0.05–0.5% by weight, based on the total weight of the active components and calculated as metal. Higher proportions are possible if required, but are not preferred, chiefly for cost reasons.

The catalysts according to the invention which, under operating conditions, preferably have a BET surface area between 5 and 200 $m^2/g$ depending on by nitrogen adsorption preferably comprise, independently of the preparation process selected, 70–90% by weight of $TiO_2$, 1–30% by weight of $V_2O_5$ and 0.01–0.9% by weight, calculated as metal, of an oxide of a noble metal or a plurality of noble metals of subgroup 8. Catalysts of 80–97% by weight of $TiO_2$ having an anatase content of at least 65% by weight, 3–20% by weight of $V_2O_5$ and 0.05–0.5% by weight of palladium oxide, which have a BET surface area of 10–100 $m^2/g$ under operating conditions, are particularly preferred.

The catalysts according to the invention can be prepared in a manner known per se by simultaneous preparation methods (combining all components in a single operating step) or by sequential preparation (combining the components in different operating steps, between which a thermal and/or chemical treatment of the catalyst intermediate is possible).

Simultaneous preparation of the catalysts according to the invention is possible, for example, by surface wetting of the $TiO_2$ by mechanical mixing or grinding, for example in a ball mill or colloid mill, with a vanadium oxide, preferably $V_2O_5$, or with a vanadium compound, which converts on heating in air into a vanadium oxide, preferably ammonium metavanadate, and with the noble metal compound or the noble metal compounds, preferably in the presence of water. However, $TiO_2$ can alternatively be impregnated with an aqueous solution containing the vanadium component(s), preferably with a hot saturated aqueous ammonium metavanadate solution or with a solution of $V_2O_5$ or ammonium metavanadate in hot aqueous oxalic acid, and with the noble metal compound or the noble metal compounds. The total amount of vanadium compound added, calculated as $V_2O_5$, is 1–30% by weight, preferably 3–20% by weight. After mixing or impregnation has been carried out, the water is evaporated, if necessary, and the remaining pulverulent reaction production is activated by heating for 0.5 to 16 hours at 200°–500° C. in an air current, preferably by heating for 1 to 8 hours at 300°–450° C.

However, the catalysts according to the invention can also be prepared by a sequential preparation process in the manner as proposed in U.S. Pat. Nos. 4,582,912 and 4,835, 126 for catalysts for the partial oxidation of aromatic hydrocarbons to give the corresponding carboxylic anhydrides: in the first step, $TiO_2$ is wetted by one of the above-described methods, preferably with $V_2O_5$ or a compound which converts on heating into $V_2O_5$. After heating for 1 to 24 hours in air at 250°–600° C., preferably heating for 4 to 20 hours at 400°–550° C. for example in a crucible or rotary kiln, the resulting powder is mixed and/or ground, in the presence of a vanadium oxide or a compound which converts on heating in air into a vanadium oxide, preferably in the presence of $V_2O_5$, and a compound or a plurality of compounds of a noble metal or of a plurality of noble metals of subgroup 8, in the presence or absence of water, and, after drying if necessary, is heated for activation for a period of 0.5–16 hours at 200°–500° C., preferably 1–8 hours at 300°–450° C., in an air current. The total amount of vanadium compound(s) added, calculated as $V_2O_5$, is preferably apportioned between the first and third preparation step in the ratio 4:1 to 1:4 and is in total 1–30% by weight, preferably 3–20% by weight, calculated as $V_2O_5$.

In the sequential preparation of the catalysts according to the invention by the above-described process, the catalyst precursor prepared by wetting the $TiO_2$ with the vanadium oxide or the vanadium compound and by calcining, to remove the adhering, non-chemically-bound $V_2O_5$, is preferably treated with a suitable solvent, preferably a water-based solvent. Suitable solvents in this case are those solvents which take up the adhering $V_2O_5$ but not the chemically bound vanadium oxide and/or the $TiO_2$, for example aqueous solutions of acids and bases. Readily suitable solvents are, for example, aqueous solutions of ammonium, hydrochloric acid, oxalic acid, formic acid and acetic acid. Semi-concentrated aqueous ammonia or oxalic acid solution is preferably used.

The precursor can be washed, for example, by stirring once or repeatedly in the solvent at room temperature or elevated temperature and subsequent filtration or centrifugation and drying; if necessary, the precursor is subsequently washed with distilled water. The washed product can be further processed by mixing with a vanadium oxide or a vanadium compound and the noble metal compound or the noble metal compounds, as specified, or by impregnating with vanadium-containing and noble metal-containing solution, followed by activation in an air current at elevated temperature.

The sequential preparation method, including washing out the adhering $V_2O_5$ after the first calcination step, is particularly suitable for the preparation of the catalysts according to the invention.

It is known to those skilled in the art that $TiO_2$ in the anatase form can be stabilized by doping with certain transition metal oxides against the conversion into rutile or against excessive agglomeration of the primary particles. In this context, compounds of yttrium, lanthanum, of the lanthanide elements and of zirconium, hafnium, niobium, tantalum, molybdenum and tungsten prove useful. In the case of the catalysts according to the invention, the $TiO_2$ used in the anatase form can be doped with the transition metal compound by intensive mixing and calcining either before its processing or—in the case of the sequential preparation procedure—during the first preparation step (wetting with $V_2O_5$ or a vanadium compound). Suitable usage forms are the oxides, halides, oxihalides, nitrates, sulfates, carbonates and carboxylates of the said elements. The amount used should not exceed 5% by weight, calculated as oxide and based on the $TiO_2$ in the anatase form. Stabilization of the anatase phase in the total oxidation catalysts according to the invention with 0–2% by weight of tungsten trioxide ($WO_3$), based on $TiO_2$ in the anatase form, is particularly preferred; the tungsten compound can be added, for example, as $WCl_6$ or $WO_3$.

The catalysts according to the invention can be used as unsupported catalysts in the form of powders, moldings or extrudates for their respective purpose. In addition, there is the possibility of coating, by conventional processes, inorganic heat-resistant support bodies, such as porous or densely sintered spheres or rings and pellets or other three-dimensional porous support materials or honeycombs or monoliths provided with ducts, in order by this means to reduce the pressure resistance. Support materials which are useful are, for example, steatite, duranite, cordierite, mullite, earthenware, porcelain, silicon dioxide, other silicates, aluminum oxide, other aluminates, silicon carbide, silicon nitride or mixtures thereof and metal bodies of stainless steel or so-called heat-conducting alloys (Cr/Fe/Al alloys). The supported catalysts can obviously also be prepared according to the prior art in such a way that the supports are impregnated once or repeatedly with titanium-, vanadium- and noble metal-containing solutions and then calcined. If the catalysts are used, for example, in pressed, extruded or supported form, the activation by heating in an air current can alternatively be carried out after shaping.

The catalysts according to the invention are suitable for the purification of exhaust gases of all types containing carbon monoxide and oxidizable organic compounds by catalytic afterburning (CAB), in which case the exhaust gases either contain molecular oxygen (e.g. exhaust air stream) to ensure the combustion or oxygen is added before the exhaust gases are passed over the catalyst. Typical oxidizable organic compounds in exhaust air streams which are burnt, in an atmosphere containing molecular oxygen, by being passed over the catalysts according to the invention to form carbon dioxide are aliphatic hydrocarbons, aromatic hydrocarbons, carboxylic acids, aldehydes, acid anhydrides, esters and mixtures thereof. The catalysts according to the invention are particularly suitable for the purification of exhaust gases from the phthalic anhydride and maleic anhydride production by catalytic afterburning. Other oxidizable organic compounds are those which not only contain carbon and hydrogen and/or oxygen, but also other elements, for example nitrogen, phosphorus or chlorine. Even passing such compounds over them does not poison the catalysts according to the invention. However, in this case, in the total oxidation, not only are carbon dioxide and water formed, but also inorganic compounds of the elements present which are removed by subsequent purification steps such as passing through a scrubber.

If the exhaust air streams to be purified, in addition to the said contaminants, further contain nitrogen oxides, as is the case, for example, with exhaust gases from combustion plants, it can be expedient to combine the catalysts according to the invention with a second catalyst for the catalytic reduction of nitrogen oxide (SCR). Catalysts of this type, according to the prior art, are made up of, for example, $TiO_2$, $WO_3$ and $V_2O_5$ and are operated with injection of ammonia.

The oxidation of carbon monoxide, hydrocarbons and/or other oxidizable organic compounds can be carried out in any atmosphere containing molecular oxygen, for example air, at elevated temperature. By way of example, an oxidizable organic compound is passed in vapor form in a mixture with air over the catalyst bed which is kept at 150° to 550° C., preferably 150° to 350° C. in particular 150° to 250° C. The kick-off temperatures are preferably 150° to 230° C. The lower kick-off or operating temperatures, in comparison with the $Al_2O_3$-containing catalysts according to the prior art, lead to an energy saving; even when the organic loadings of the exhaust air streams are low, the operating temperature can in some cases be maintained without additional energy supply.

The catalysts according to the invention are particularly suitable for purifying exhaust gases from production plants in which phthalic anhydride (PA) is prepared by gas-phase oxidation of o-xylene and/or naphthalene, which PA is further processed principally in the plasticizer industry, and for the purification of exhaust gases from maleic anhydride production. Typical exhaust gases from PA plants, after desublimation of the condensable reaction products, contain—depending on process conditions—about 77% by weight of nitrogen and noble gases, 15–19% by weight of oxygen, 2–5% by weight of water, 1.7–3% by weight of carbon dioxide, 0.4–0.7% by weight of carbon monoxide, 0.2–0.3% by weight of maleic anhydride, 0.02–0.04% by weight each of PA and benzoic acid and 0.03–0.05% by weight of other substances such as o-tolylaldehyde, o-xylene and formaldehyde. While the content of PA, maleic anhydride and benzoic acid can be further reduced by a downstream aqueous scrubbing, the exhaust air contents, for example, of carbon monoxide, o-xylene, o-tolylaldehyde and formaldehyde can lead to the maximum limits legally specified in some countries being exceeded, which makes an exhaust gas purification necessary, e.g. by CAB. Furthermore, the combustion of these constituents is necessary if the process air is circulated in accordance with the prior art, which in some cases has accompanying advantages such as lower energy consumption or altered explosion parameters.

The catalysts according to the invention make possible, at operating temperatures of 150° to 550° C., preferably 150° to 350° C. in particular 150° to 250° C., virtually quantitative removal of the said compounds from the exhaust air streams of PA plants which, after the catalytic afterburning (CAB) with these catalysts, apart from nitrogen, oxygen and noble gases, contain virtually only carbon dioxide and water; these can thus be safely passed into the atmosphere or returned to the reaction in the case of a circulation procedure.

The examples below serve to further describe the invention.

EXAMPLE 1

22.5 g of dried $TiO_2$ hydrate having a BET surface area of 150 m$^2$/g (calculated as $TiO_2$), 22.5 g of anatase having a BET surface area of 7 m$^2$/g, 5.0 g of $V_2O_5$ and 0.21 g of $PdCl_2$ are intensively ground in the colloid mill in the presence of 200 ml of water. After drying at 110° C., tablets having a thickness of 2–3 mm and a diameter of 4 mm are fabricated from the catalyst powder in a hydraulic press. The free pore volume, which was determined by mercury porosity measurement, is 0.25 ml/g. The finished catalyst contained 10.0% by weight of $V_2O_5$ and 0.25% by weight of Pd, calculated as metal, and, after activation for 4 hours at 350° C. in an air current, has a BET surface area of 52 m$^2$/g.

EXAMPLE 2

The procedure as described in Example 1 is followed, with the difference that instead of the $TiO_2$ hydrate/anatase mixture, 45.0 g of $TiO_2$ hydrate are used. The finished catalyst contains 10.0% by weight of $V_2O_5$ and 0.25% by weight of Pd, calculated as metal, and, after activation for 4 hours at 350° C. in an air current, has a BET surface area of 85 m$^2$/g.

EXAMPLE 3

The procedure as described in Example 1 is followed, with the difference that, instead of the $TiO_2$ hydrate/anatase mixture, 45.0 g of a kind of $TiO_2$ are used which comprises 65% by weight of anatase and 35% by weight of rutile and has a BET surface area of 55 m$^2$/g. The finished catalyst contains 10.0% by weight of $V_2O_5$ and 0.25% by weight of Pd, calculated as metal, and, after activation for 4 hours at 350° C. in an air current, has a BET surface area of 39 m$^2$/g.

EXAMPLE 4

The catalyst is prepared by a sequential preparation method: 21.5 g of dried $TiO_2$ hydrate having a BET surface area of 150 m$^2$/g (calculated as $TiO_2$), 21.5 g of anatase having a BET surface area of 7 m$^2$/g and 7.0 g of $V_2O_5$ are intensively ground in the presence of 200 ml of water in the colloid mill. After drying at 110° C. and calcining for 16 hours at 500° C. the resulting catalyst precursor is ground in the colloid mill in the presence of 200 ml of water together with 2.5 g of $V_2O_5$ and 0.22 g of $PdCl_2$ and, after drying, is tabletted. The finished catalyst contains 17.5% by weight of $V_2O_5$ and 0.25% by weight of Pd, calculated as metal, and has a BET surface area of 15 m$^2$/g.

EXAMPLE 5

Example 4 is repeated using the quantities listed with the difference that the catalyst precursor, after calcining, is additionally subjected to a treatment with half-concentrated aqueous ammonia solution at room temperature, until the wash water is free from vanadate ions. The catalyst intermediate is subsequently washed with distilled water and dried. The finished catalyst, after grinding with $V_2O_5$ and $PdCl_2$, has a $V_2O_5$ content of 8.0% by weight, a Pd content of 0.28% by weight, calculated as metal, and a BET surface area of 17 $m^2/g$.

EXAMPLE 6

Example 5 is repeated with the difference that the wetting of the $TiO_2$ mixture in the first working step is carried out by impregnation with ammonium metavanadate solution: a well-homogenized mixture of 21.5 g of dried $TiO_2$ hydrate (calculated as $TiO_2$) and 21.5 g of anatase is impregnated by stirring with a hot solution of 10.0 g of $NH_4VO_3$ in 180 ml of distilled water. Evaporation of the solvent is followed by a 16 hour calcination at 500° C., grinding with 2.5 g of $V_2O_5$ and 0.20 g of $PdCl_2$ and, after drying, tabletting. The finished catalyst contains 8.2% by weight of $V_2O_5$ and 0.25% by weight of Pd, calculated as metal, and has a BET surface area of 13 $m^2/g$.

EXAMPLE 7

Example 6 is repeated with the difference that, in the impregnation of the $TiO_2$ mixture, 1.0 g of $WCl_6$ is additionally dissolved in the $NH_4VO_3$ solution. The finished catalyst contains 8.1% by weight of $V_2O_5$, 1.3% by weight of $WO_3$ and 0.25% by weight of Pd, calculated as metal, and has a BET surface area of 15 $m^2/g$.

EXAMPLE 8

The catalysts according to the invention prepared in accordance with the Examples 1–7, after activation for 4 hours at 350° C. in an air current, are used for the total oxidation of o-xylene: a quartz tube (length 450 mm, internal diameter 15 mm) horizontally arranged in a temperature-controlled tubular furnace serves as reaction tube which contains, in the center of the furnace, 5.0 g of catalyst moldings (115±15 pieces, width of the bed 22± 3 mm) and, as a preheating zone, 10.0 g of uncoated 4 mm steatite balls; moldings and balls are fixed by quartz wool plugs. The catalysts are activated in each case by heating for 4 hours at 350° C. in an air current in the reaction tube. The reaction gas is loaded by introducing, by a glass frit, synthetic air from a pressurized cylinder (80% by volume of $N_2$, 20% by volume of $O_2$) into o-xylene heated to 40° C., which leads to a loading of 50 g of o-xylene per $m^3$ (S.T.P.) of air. The flow rate is set to 9 l/hour, the space velocity is about 2300 $h^{-1}$. Sublimable reaction products are condensed in a glass separator attached at the tube end, volatile reaction products are then collected in an acetone-filled wash bottle and gaseous substances are collected in a gas-collecting bulb; the composition is determined by gas chromatography in each case. The following results are obtained: in all cases, above the kick-off temperature, only $CO_2$ and $H_2O$ can be detected as reaction product; the following kick-off temperatures were determined:

catalyst from Example 1: 215° C.
catalyst from Example 2: 205° C.
catalyst from Example 3: 220° C.
catalyst from Example 4: 200° C.
catalyst from Example 5: 205° C.
catalyst from Example 6: 190° C.
catalyst from Example 7: 185° C.

COMPARATIVE EXAMPLE 1

A catalyst is prepared analogously to Example 1 in a simultaneous preparation method, but without palladium oxide doping: a mixture of 20.0 g of dried $TiO_2$ hydrate (calculated as $TiO_2$) having a BET surface area of 150 $m^2/g$, 20.0 g of anatase having a BET surface area of 7 $m^2/g$ and 10.0 g of $V_2O_5$ is intensively ground in an annular-gear colloid mill. After drying at 110° C., moldings are produced from the resulting powder, as described in Example 1. The finished catalyst contains 20.0% by weight of $V_2O_5$ and, after activation for 4 hours at 350° C. in an air current, has a BET surface area of 48 $m^2/g$, determined by nitrogen adsorption.

COMPARATIVE EXAMPLE 2

As in Comparative Example 1, a mixture of 20.0 g of dried $TiO_2$ hydrate (calculated as $TiO_2$), 20.0 g of anatase and 10.0 g of $V_2O_5$ is intensively ground in an annular-gear colloid mill in the presence of 200 ml of distilled water. Calcination for 16 hours at 500° C. is followed, as described in Example 4, by treatment with aqueous ammonia solution. The powder has a $V_2O_5$ content of 3.0% by weight and a BET surface area of 17 $m^2/g$; it is tabletted as specified in Example 1.

COMPARATIVE EXAMPLE 3

50.0 g of $V_2O_5$ are mixed with 0.4 g of $PdCl_2$ in the colloid mill in the presence of water, dried and tabletted as specified. The finished catalyst contains 0.48% by weight of Pd, calculated as metal, and, after activation for 4 hours at 350° C. in an air current, has a BET surface of 8 $m^2/g$.

COMPARATIVE EXAMPLE 4

The procedure as described in Comparative Example 2 is first followed using the specified quantities. Washing with ammonia is followed by mixing and further colloid grinding of the powder together with 2.5 g of $V_2O_5$, 0.47 g of $Cu(NO_3)_2.6H_2O$ and 0.08 g of $PdCl_2$, followed by drying and tabletting. The finished catalyst contains 8.5% by weight of $V_2O_5$ and 0.22% by weight of Cu and 0.11% by weight of Pd, calculated as the metal in each case, and has a BET surface area of 16 $m^2/g$.

COMPARATIVE EXAMPLE 5

The procedure as specified in Comparative Example 4 is followed, with the exception that, instead of the Cu compound and Pd compound, 0.18 g of $AgNO_3$ is used. The finished catalyst contains 8.6% by weight of $V_2O_5$ and 0.25% by weight of Ag, calculated as metal, and has a BET surface area of 16 $m^2/g$.

COMPARATIVE EXAMPLE 6

This comparative example describes the use of the catalysts prepared according to the Comparative Examples 1–5 for the oxidation of o-xylene, analogously to the procedure in Example 8.

Catalyst from Comparative Example 1

At a reactor temperature of 180°–220° C. the majority of the evaporated o-xylene is collected in acetone, at 230°–260° C., o-xylene, PA and lower oxidation products such as o-tolylaldehyde and CO and $CO_2$ can be detected and at 270°–350° C., PA, maleic anhydride, CO and $CO_2$ can be detected; the maximum PA yield, based on o-xylene used, is 50% by weight at 290° C.

Catalyst from Comparative Example 2

As with the catalyst from Comparative Example 1, in the lower temperature range, virtually no reaction occurred, above 250° C., apart from PA, principally CO and $CO_2$ form in a volume ratio of about 1:2.5; the maximum PA yield is 12% by weight at 300° C.

Catalyst from Comparative Example 3

The catalyst has a kick-off temperature (at least 95% combustion of the o-xylene to give $CO_2$) of 280° C.; the formation of PA and/or CO cannot be detected.

Catalyst from Comparative Example 4

The catalyst has a kick-off temperature of 250° C.; the formation of PA and/or CO cannot be detected.

Catalyst from Comparative Example 5

A similar behavior as with the catalyst from Comparative Example 1 is observed; the maximum PA yield is 65% by weight at 270° C.

COMPARATIVE EXAMPLE 7

A supported catalyst is prepared for the gas phase oxidation of o-xylene to give PA in accordance with DE 21 06 796, Example 4: 20.0 g of dried $TiO_2$ hydrate (calculated as $TiO_2$), 60.0 g of anatase and 20.0 g of $V_2O_5$ are suspended in 250 ml of distilled water together with 25.0 g of a 50% strength by weight aqueous dispersion of a vinyl acetate/vinyl laurate copolymer. In a coating apparatus, 1000 g of low-porosity steatite balls each having a diameter of 4 mm are coated with this suspension at 110° C.; the application yield, based on the oxidic solid, is 95% by weight. The catalytically active surface coating contains 19.8% by weight of $V_2O_5$ and has a BET surface area of 32 $m^2/g$, determined after heating to incandescence for 4 hours at 400° C. and shaking off the coating.

COMPARATIVE EXAMPLE 8

The reaction tube of the laboratory apparatus described in Example 8 is charged in the center of the furnace with 30.0 g of the PA catalyst prepared in accordance with Comparative Example 7 and, on the reactor inlet side, with 10.0 g of uncoated 4 mm steatite balls; the beds are fixed with quartz wool plugs. At a flow rate of 9 l/h and an o-xylene loading of 50 $g/m^3$ (S.T.P.) of air, at a reactor temperature of 350° C., 95% by weight of PA, based on o-xylene used, are collected. The exhaust air contains 1.3% by volume of $CO_2$, 0.5% by volume of CO and 200 $mg/m^3$ (S.T.P.) of organic constituents.

EXAMPLE 9

Comparative Example 8 is repeated with the modification that 5.0 g of the total oxidation catalyst prepared according to Example 7 are introduced downstream of the PA catalyst on the reactor outlet side. Only $CO_2$ and $H_2O$ can be detected in the exhaust air; all reaction products of the PA preparation are burnt at the catalyst according to the invention.

EXAMPLE 10

The following laboratory set-up is constructed: a tubular furnace, which contains 30.0 g of the PA catalyst from Comparative Example 7, is combined with a second tubular furnace which contains 5.0 g of the total oxidation catalyst from Example 7; provided upstream of both catalysts is a preheating zone of 10.0 g of uncoated 4 mm steatite balls in each case. An o-xylene/air mixture which contains 50 g of o-xylene/$m^3$ (S.T.P.) is passed over the PA catalyst heated to 350° C. at a volumetric flow rate of 9 l/h. After desublimation of the PA crude product, the reaction gas is passed over the catalyst according to the invention at an operating temperature of 200° C. Apart from 1.9% by volume of $CO_2$, no carbon-containing constituents can be detected in the exhaust air.

We claim:

1. A catalyst for the catalytic afterburning of exhaust gases from phthalic anhydride or maleic anhydride production containing carbon monoxide and/or oxidizable organic compounds in the presence of molecular oxygen containing a) 70–99% by weight, calculated as $TiO_2$, of a titanium dioxide component, b) 1 to 30% by weight, calculated as $V_2O_5$, of a vanadium oxide component selected from the group consisting of vanadium oxides of the formula $V_nO_{2n+1}$ wherein n has a value of from 2 to 7 or a vanadium compound which converts into a vanadium oxide on heating in air, and c) 0.01 to 0.9% by weight, calculated as noble metal of a noble metal component consisting of one or more compounds of palladium, platinum, and rhodium and said catalyst having a BET-surface area of 10 to 100 $m^2/g$ at an operation temperature of 150°–550° C.

2. The catalyst as claimed in claim 1, wherein the noble metal component is at least one compound selected from the group consisting of a palladium compound and a platinum compound.

3. The catalyst as claimed in claim 1, wherein the titanium oxide component is doped with up to 5% by weight, based on $TiO_2$, of oxide compounds selected from the group consisting of yttrium, lanthanum, the lanthanide elements, zirconium, hafnium, niobium, tantalum, molybdenum and tungsten.

4. The catalyst as claimed in claim 3, wherein the doping compound is 0.1–5% by weight, based on $TiO_2$, of tungsten oxide or a compound which is converted into tungsten oxide on heating.

5. The catalyst as claimed in claim 1 in the form of homogeneous moldings or extrudates or in form of a non-porous or porous support body, of in the optionally in form of a honeycomb-like support body or support body provided with ducts, coated therewith.

6. A process for the preparation of a catalyst as claimed in claim 1 which comprises mixing or grinding, dry or in the presence of water or another solvent, $TiO_2$, $V_2O_5$ or a compound which converts into $V_2O_5$ on heating in air and a compound selected from the group consisting of palladium, platinum and rhodium and, after evaporation of any solvent, activating the product for a period of 0.5–16 hours at 200°–500° C. in an air current.

7. A process for the preparation of a catalyst as claimed in claim 1 which comprises a) wetting $TiO_2$ with $V_2O_5$ or a compound which converts into $V_2O_5$ on heating in air, by mixing or grinding or impregnating, b) heating the product from step a) for a period of 1–24 hours at 250°–600° C. in air c) mixing or grinding the product from step b) with a vanadium oxide or a compound which converts into a vanadium oxide on heating in air, and a compound selected from the group consisting of palladium, platinum and rhodium and d) activating the product from step c) for a period of 0.5–16 hours at 200°–500° C. in an air current.

8. A process for the purification of exhaust gases from phthalic anhydride or maleic anhydride production containing carbon monoxide and/or oxidizable organic compounds by catalytic afterburning in the presence of oxygen to form carbon dioxide and water at operating temperatures between 150° and 550° C. and kick-off temperatures between 150° and 230° C. which comprises conducting the process in the presence of the catalyst as claimed in claim 1.

* * * * *